United States Patent [19]
Yokoyama

[11] Patent Number: 5,841,909
[45] Date of Patent: Nov. 24, 1998

[54] METHOD OF GENERATING AN ORTHOGONAL BASIS FUNCTION SET IN AN IMAGE PROCESSING SYSTEM

[75] Inventor: Yutaka Yokoyama, Tokyo, Japan

[73] Assignee: NEC Corporation, Tokyo, Japan

[21] Appl. No.: 756,712

[22] Filed: Nov. 26, 1996

Related U.S. Application Data

[63] Continuation of Ser. No. 266,765, Jun. 28, 1994, abandoned.

[30] Foreign Application Priority Data

Jun. 28, 1993 [JP] Japan .................................. 5-156504

[51] Int. Cl.$^6$ ....................................................... G06K 9/36
[52] U.S. Cl. ........................................... 382/243; 382/248
[58] Field of Search ..................................... 382/131, 239, 382/243, 248, 250

[56] References Cited

U.S. PATENT DOCUMENTS

| 5,109,451 | 4/1992 | Aono et al. | 382/248 |
| 5,367,629 | 11/1994 | Chu et al. | 382/25 C |
| 5,384,849 | 1/1995 | Jeong | 382/248 |
| 5,390,258 | 2/1995 | Levin | 382/131 |

OTHER PUBLICATIONS

Gilge et al., "Coding Of Arbitrarily Shaped Image Segments Based On A Generalized Orthogonal Transform", *Signal Processign: Image Communication*, pp. 153–180, (Apr. 1989).

Haralick et al., "Image Segmentation Techniques", *Computer Vision, Graphics, and Image*, vol. 29:100–132, (Jun. 1985).

Freeman, "Computer Processing of Line–Drawing Images", *Computing Surveys*, vol. 6:57–97, (Mar. 1974).

*Primary Examiner*—Christopher S. Kelley
*Attorney, Agent, or Firm*—Foley & Lardner

[57] ABSTRACT

A set of orthonormal basis functions is determined with respect to a rectangle which includes an arbitrarily shaped image segment. The set of orthonormal basis functions is used to determine a set of orthogonal basis function candidates which are numbered along a zigzag scan. Subsequently, a first orthogonal basis function candidate is extracted and defined as a first orthogonal basis function. Then, a loop for generating a set of orthogonal basis functions is initiated. First, a next basis function candidate is extracted in numbered order. An orthogonal component is determined which is perpendicular to a hyperplane spanned by the orthogonal basis function. Thereafter, a check is made as to whether an absolute value of the orthogonal component exceeds a threshold. If the absolute value does not exceed the threshold, it is disregarded and the operation returns to the beginning of the loop. On the other hand, if the absolute value exceeds the threshold, the orthogonal component is selected and defined as the next orthogonal basis function, after which the operation returns to the beginning of the loop. Alternatively, a set of orthogonal basis functions is generated by successively ascertaining a maximum orthogonal component among a plurality of orthogonal components in place of determining whether the absolute value of the orthogonal component exceeds the threshold.

4 Claims, 12 Drawing Sheets

FIG. 6A
(PRIOR ART)
[1]

| 0.4472 | 0.4472 | 0.4472 |
|---|---|---|
| 0.4472 | | |
| 0.4472 | | |

| 0.3354 | -0.2236 | -0.7826 |
|---|---|---|
| 0.3354 | | |
| 0.3354 | | |

| 0.6339 | 0.2535 | -0.1268 |
|---|---|---|
| -0.0423 | | |
| -0.7184 | | |

| 0.3450 | 0.1380 | -0.0690 |
|---|---|---|
| -0.8281 | | |
| 0.4140 | | |

| 0.3220 | -0.3673 | 0.0000 |
|---|---|---|
| -0.8110 | | |
| -0.3220 | | |

$$\begin{pmatrix} 1.0 & 0.0 & 0.0 & 0.0 & -0.5 \\ 0.0 & 1.0 & 0.0 & 0.0 & -0.2 \\ 0.0 & 0.0 & 1.0 & 0.0 & 0.4 \\ 0.0 & 0.0 & 0.0 & 1.0 & 0.6 \\ -0.5 & -0.2 & 0.4 & 0.6 & 1.0 \end{pmatrix}$$

FIG. 10A

| 0.4472 | 0.4472 | 0.4472 |
|---|---|---|
| 0.4472 | | |
| 0.4472 | | |

| 0.3354 | -0.2236 | -0.7826 |
|---|---|---|
| 0.3354 | | |
| 0.3354 | | |

| 0.6339 | 0.2535 | -0.1268 |
|---|---|---|
| -0.0423 | | |
| -0.7184 | | |

| 0.3450 | 0.1380 | -0.0690 |
|---|---|---|
| -0.8281 | | |
| 0.4140 | | |

| 0.4082 | -0.8165 | 0.4082 |
|---|---|---|
| 0.0000 | | |
| 0.0000 | | |

$$\begin{pmatrix} 1.0 & 0.0 & 0.0 & 0.0 & 0.0 \\ 0.0 & 1.0 & 0.0 & 0.0 & 0.0 \\ 0.0 & 0.0 & 1.0 & 0.0 & 0.0 \\ 0.0 & 0.0 & 0.0 & 1.0 & 0.0 \\ 0.0 & 0.0 & 0.0 & 0.0 & 1.0 \end{pmatrix}$$

FIG. 13A

| 0.4472 | 0.4472 | 0.4472 |
|---|---|---|
| 0.4472 | | |
| 0.4472 | | |

| 0.3651 | -0.5477 | 0.3651 |
|---|---|---|
| -0.5477 | | |
| 0.3651 | | |

| 0.8165 | 0.0000 | -0.4082 |
|---|---|---|
| 0.0000 | | |
| -0.4082 | | |

| 0.0000 | -0.3162 | -0.6325 |
|---|---|---|
| 0.3162 | | |
| 0.6325 | | |

| 0.0000 | 0.6325 | -0.3162 |
|---|---|---|
| -0.6325 | | |
| 0.3162 | | |

$$\begin{pmatrix} 1.0 & 0.0 & 0.0 & 0.0 & 0.0 \\ 0.0 & 1.0 & 0.0 & 0.0 & 0.0 \\ 0.0 & 0.0 & 1.0 & 0.0 & 0.0 \\ 0.0 & 0.0 & 0.0 & 1.0 & 0.0 \\ 0.0 & 0.0 & 0.0 & 0.0 & 1.0 \end{pmatrix}$$

FIG. 16A

| 0.4472 | 0.4472 | 0.4472 |
|---|---|---|
| 0.4472 | | |
| 0.4472 | | |

| 0.0000 | -0.3162 | -0.6325 |
|---|---|---|
| 0.3162 | | |
| 0.6325 | | |

| 0.8165 | 0.0000 | -0.4082 |
|---|---|---|
| 0.0000 | | |
| -0.4082 | | |

| 0.0000 | 0.6325 | -0.3162 |
|---|---|---|
| -0.6325 | | |
| 0.3162 | | |

| 0.3651 | -0.5477 | 0.3651 |
|---|---|---|
| -0.5477 | | |
| 0.3651 | | |

$$\begin{pmatrix} 1.0 & 0.0 & 0.0 & 0.0 & 0.0 \\ 0.0 & 1.0 & 0.0 & 0.0 & 0.0 \\ 0.0 & 0.0 & 1.0 & 0.0 & 0.0 \\ 0.0 & 0.0 & 0.0 & 1.0 & 0.0 \\ 0.0 & 0.0 & 0.0 & 0.0 & 1.0 \end{pmatrix}$$

METHOD OF GENERATING AN ORTHOGONAL BASIS FUNCTION SET IN AN IMAGE PROCESSING SYSTEM

This application is a continuation of application Ser. No. 08/266,765, filed Jun. 28, 1994, now abandoned.

BACKGROUND OF THE INVENTION

1. Field of the Invention

The present invention relates generally to improvements in a digital image processing system and more specifically to a method of coding arbitrarily shaped image segments wherein calculation errors can markedly be reduced. The present invention is also applicable to a decoder for reproducing an original image signal while holding the same features of the present invention.

2. Description of the Prior Art

Digital image coding has found effective applications ranging from medical imagery, remote sensing up to image communication such as video conference and picture telephone.

Prior to image coding it is necessary to divide each of incoming digital frame images into a plurality of segments. Typical image segmentation is to partition the frame image into rectangular blocks (viz., block-segmentation), after which each block is coded separately.

The block-segmentation has several advantages of no transmission of shape or contour information due to fixed block-size and low computational complexity. However, the independent treatment of each block often results in a visibility of the block boundaries in the reproduced Image, called blocking-effect, due to discontinuities in the gray values between adjacent blocks.

In recent years, in order to overcome the problems inherent in the block-segmentation, a region-oriented segmentation has been proposed. One example of which is described in a paper (PRIOR PAPER 1) by Michael GILGE, et al., entitled "CODING OF ARBITRARILY SHAPED IMAGE SEGMENTS BASED ON A GENERALIZED ORTHOGONAL TRANSFORM" published 1989 by Elsevier Science Publishers B.V.

Before turning to the present invention it is deemed preferable to briefly discuss an image signal encoder with reference to FIG. 1.

The present invention is directly concerned with an orthogonal basis function generator 14 of FIG. 1, and as such, the other blocks 10, 12, 16, and 18 will not be discussed in detail merely for the sake of simplifying the disclosure.

In FIG. 1, a digital image signal S1 is successively applied to the arbitrarily shaped image segmentation circuit 10 on a frame basis.

The circuit 10 stores one frame image data in a suitable memory (not shown) and then carries out image segmentation utilizing techniques such as measurement space guided clustering or single linkage region growing. These techniques are discussed in detail in a paper (PRIOR PAPER 2) by Robert M. HARALICK, et al. entitled "Survey: Image Segmentation Techniques", computer vision, graphics, and image processing 29, 100–132 (1985), published by Academic Press, Inc.

The above mentioned clustering technique defines a partition in measurement space. Then each pixel is assigned the label of the cell in the measurement space partition to which it belongs. The image segments are defined as the connected components of the pixels having the same label. The image segmentation circuit 10 outputs a shape signal S2 and a segment content signal S3.

The contour coding circuit 12 is supplied with the shape signal S2 and codes a contour thereof utilizing a chain coding scheme (for example) described in a paper by Herbert Freeman, entitled "Computer Processing of Line-Drawing Images", Computing Surveys, Vol. 6, No. 1, March 1974 (PRIOR PAPER 3). The circuit 12 outputs a contour code which is applied to the multiplexer 18.

The orthogonal basis function generator 14 receives the shape signal S2 and outputs a basis function set which is applied to the transform coefficient generator 16. A set of basis functions each of which is orthogonal with respect to the shape of the segment to be coded can be obtained using orthogonalization schemes. The generator 14 will be discussed in detail later and thus, further descriptions thereof are not given here.

The transform coefficient generator 16 receives the content signal S3 which represents one segmented data, and thereafter, outputs transform coefficients after orthogonally coding the content signal S3 using the basis function set applied from the generator 14.

One of the features of the coder shown in FIG. 1 is that the transmission of the basis functions for each segment is no longer required as opposed to the block segmentation as mentioned in PRIOR PAPER 1.

A known orthogonal basis function set generator 14 will be discussed.

As is well known in the art, a Gram-Schmidt process is to generate an orthonormal basis function from a given basis function. That is, an orthogonal basis function Y $$Y = \{b_1, b_2, \ldots, b_i, \ldots, b_n\} \quad (1)$$

is generated from a given basis function X $$X = \{a_1, a_2, \ldots, a_i, \ldots, a_n\} \quad (2)$$

using the following relationship:

$$b_i = a_i - \sum_{j=1}^{i-1} [(a_i b_j)/(b_j b_j)] b_j \quad (3)$$

Normalizing the orthogonal basis function given in expression (1) yields an orthonormal basis function.

According to the Gram-Schmidt process, the second term vector (depicted by $/a_i$) of expression (3)

$$/a_i = \sum_{j=1}^{i-1} [(a_i b_j)/(b_j b_j)] b_j \quad (4)$$

is a shadow of the vector $a_i$ on a hyperplane spanned by the vector $b_j$ (j=1, 2, . . . , i−1) as shown in FIG. 2 wherein $/a_i$ is represented by $a_i$ with a hat "∧". Therefore, a vector $e_i$ which indicates the difference between the vectors $/a_i$ and $a_i$, is a component which is orthogonal with respect to the above mentioned hyperplane spanned by the vector $b_j$. The vector $e_i$ is then normalized.

It is assumed that the image segmentation circuit 10 (FIG. 1) outputs a reverse L-shaped block (segment) as shown in FIG. 3, which is applied to the basis function set generator 14. As shown, the reverse L-shaped block, depicted by RLB, includes five pixels.

Firstly, the generator 14 determines nine (9) orthogonal basis functions (FIG. 4) with respect to a rectangle region, formed of 3×3 pixels, which includes the reverse L-shaped block RLB (FIG. 3). The nine orthogonal basis functions are generated using DCT (Discrete Cosine Transform) functions by way of example. In FIG. 4, bold arrows indicate a so-called zigzag scan of the nine pixels within the rectangle of FIG. 3, while the parenthesized numeral at the top of the left of each of the nine blocks indicates the order of the scan.

FIG. 5 is a table showing nine (9) sets of basis functions, each set of which is obtained by extracting the reverse L-shaped block RLB (FIG. 3) from the corresponding function set of FIG. 4 and then normalizing same. Merely for the convenience of description, each of the basis function sets shown in FIG. 5 is called a basis function candidate in the instant disclosure.

Although the number of the basis function candidate sets shown in FIG. 5 is nine, five basis function candidate sets are sufficient in that the number of the pixels within the reverse L-shaped block RLB is five in this particular case. Therefore, the five sets of the basis function candidates [1]–[5] along the zigzag scan are utilized. Thus, the following matrix can be obtained wherein the elements of the first column:

0.4472, 0.5000, 0.5000, 0.3536, and 0.5774 correspond to the leftmost vectors of the uppermost lines of the basis function candidates [1]–[5] of FIG. 5, respectively. Similarly, the second column's elements correspond to the middle vectors of the first lines of the basis candidate sets [1]–[5], and so on.

$$A = \begin{bmatrix} 0.4472 & 0.4472 & 0.4472 & 0.4472 & 0.4472 \\ 0.5000 & 0.0000 & -0.5000 & 0.5000 & 0.5000 \\ 0.5000 & 0.5000 & 0.5000 & 0.0000 & -0.5000 \\ 0.3536 & 0.3536 & 0.3536 & -0.7071 & 0.3536 \\ 0.5774 & 0.0000 & -0.5774 & 0.0000 & -0.5774 \end{bmatrix} \quad (5)$$

It is understood that the determinant of expression (5) equals zero (0) while the rank thereof is 4. This implies that the basis function candidates as discussed above are not linearly independent.

FIG. 6 is a table showing five basis functions which are obtained from the basis function candidates of FIG. 5 using equation (3) by way of 64-bit double precision floating point arithmetic operations. In FIG. 6, each of the numbers parenthesized (viz., [1]–[5]) indicates that the basis function with the numeral is obtained from the basis function candidate with the same number of FIG. 5.

An inner product matrix obtained from the basis functions of FIG. 6 is shown in FIG. 7. The matrix of FIG. 7 indicates that the No. 5 basis function is not orthogonal with respect to the other basis functions Nos. 1–4.

The vector $e_i$ is relatively large as shown in FIG. 2 and thus, any undesirable result raised from the fact that the vector $e_i$ is small is not noticeable in the above case. However, if the orthogonal component (viz., the vector $e_i$) is small as shown in FIG. 8, calculation errors are liable to occur. That is to say, if a vector $a_i$ to be orthogonalized has a component which is perpendicular to the hyperplane spanned by the following vector Y' which has already been orthogonalized $$Y' = \{b_1, b_2, \ldots, b_{i-1}\} \quad (7)$$

then vector $a_i$ can be approximated by the vector $/a_i$ of equation (4) and thus, the orthogonal component vector $e_i$ becomes small. As a result, when the vector $b_i$ is normalized using $$b_i = e_i / |e_i| \quad (8)$$

there exists the possibility that a basis function, which is not orthogonal with respect to the hyperplane spanned by Y', may be generated. In other words, calculation errors occur.

SUMMARY OF THE INVENTION

It is therefore an object of the present invention to provide a method of generating an orthogonal basis function set wherein calculation errors can be extensively reduced.

In brief, the above object is achieved by a method of generating a set of orthogonal basis functions in an image processing system. A contour signal of an arbitrarily shaped image segment is generated. Thereafter, a set of orthonormal basis functions is determined with respect to pixels within a rectangle which includes said arbitrarily shaped image segment. Further, a set of orthogonal basis function candidates is determined using a set of the orthonormal basis functions. The orthogonal basis function candidates are numbered along a pixel scan.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 6 is a table showing five orthogonal basis functions with respect to the arbitrarily shaped segment of FIG. 3, this figure having been referred to in the opening paragraphs of the instant disclosure;

FIG. 7 is an inner product matrix obtained from the orthogonal basis functions of FIG. 6;

FIG. 10 is a table showing five orthogonal basis functions obtained with the first embodiment;

FIG. 11 shows an inner product matrix obtained from the orthogonal basis functions of FIG. 10;

FIG. 13 is a table showing five orthogonal basis functions obtained with the second embodiment;

FIG. 14 shows an inner product matrix obtained from the orthogonal basis functions of FIG. 13;

FIG. 16 is a table showing five orthogonal basis functions obtained with the third embodiment; and FIG. 17 shows an inner product matrix obtained from the orthogonal basis functions of FIG. 13.

DETAILED DESCRIPTION OF THE PREFERRED EMBODIMENTS

Figure 9:
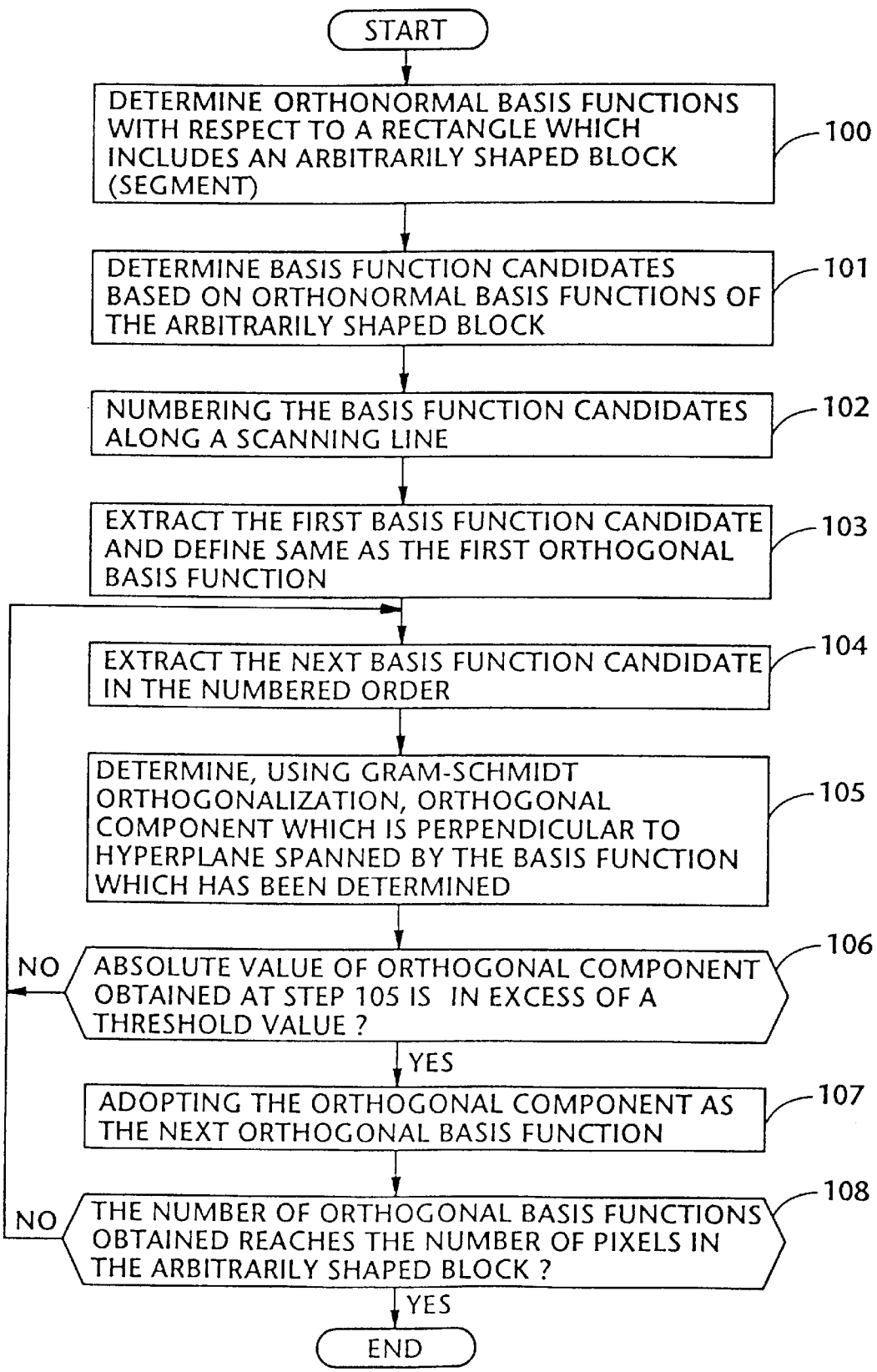
FIG. 9 is a flow chart which depicts steps which characterize a first embodiment of the present invention.

FIG. 9 is a flow chart which depicts the operation which characterizes the first embodiment of the present invention.

Figure 1:
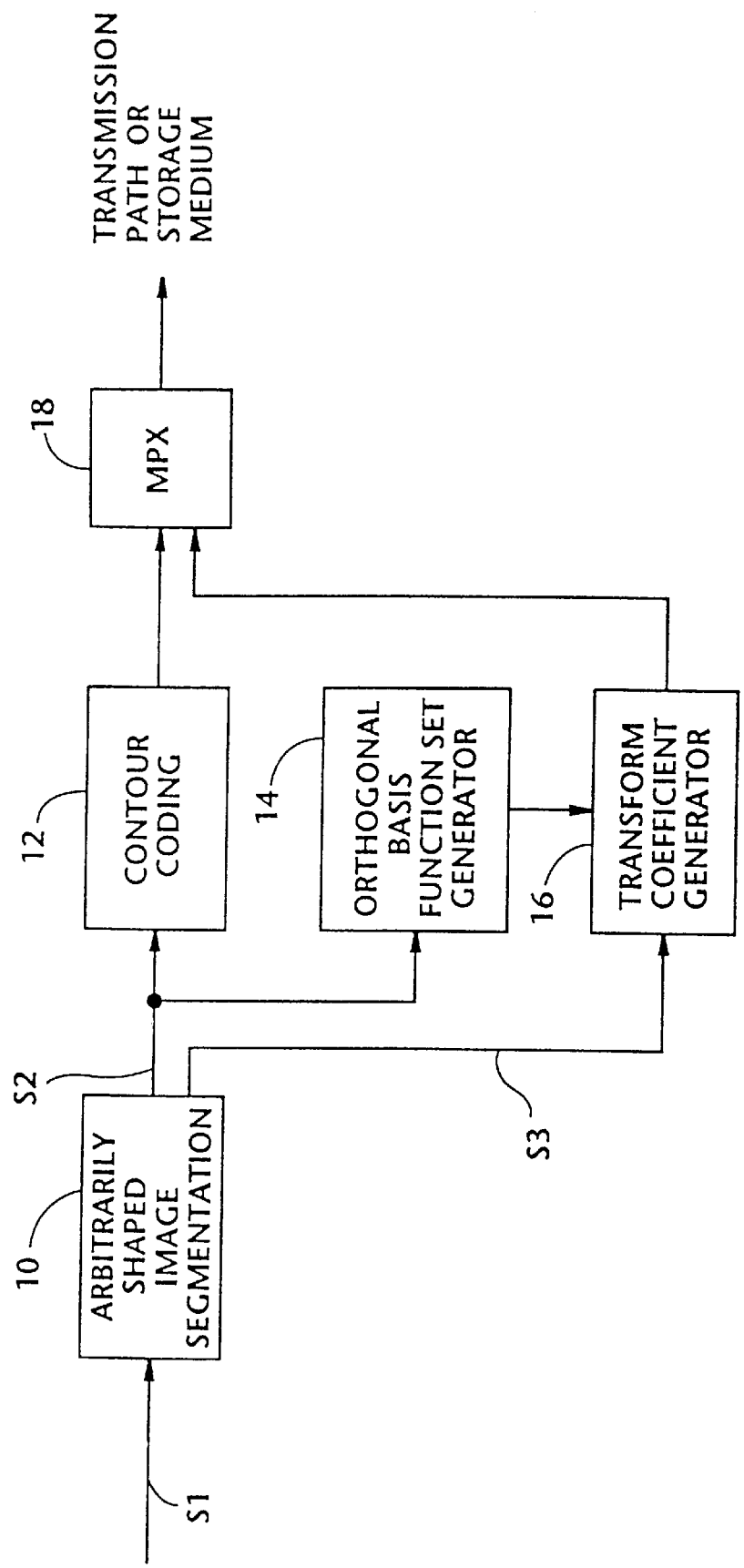
FIG. 1 is a block diagram schematically showing an encoder of a digital image processing system to which the present invention is applicable, this figure having been described in the opening paragraphs of the instant disclosure.
Figure 2:
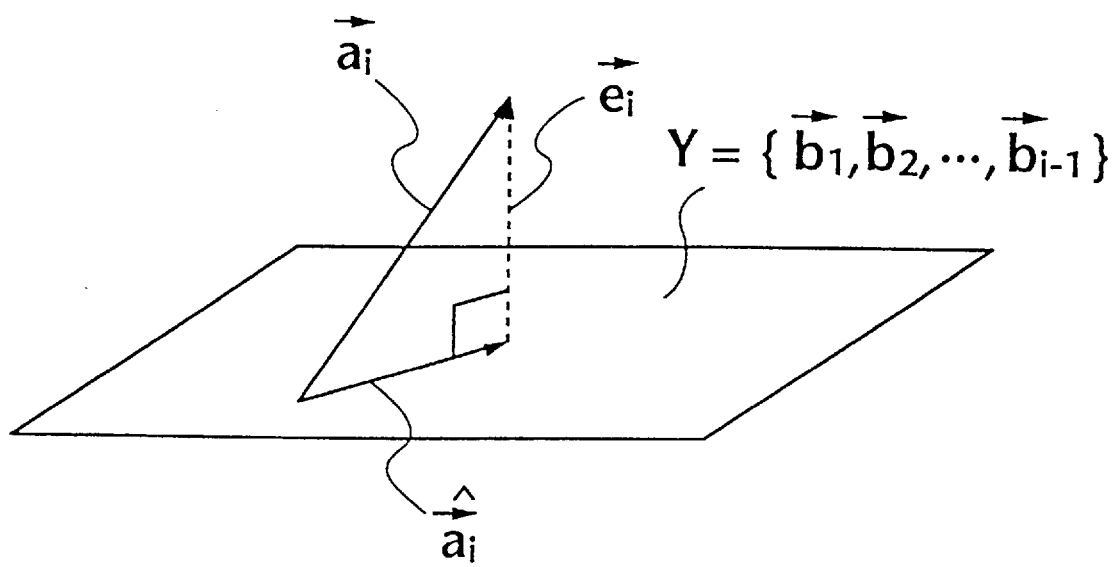
FIG. 2 is a sketch for describing the operations of one block of FIG. 1.

As mentioned above, the present invention is directly concerned with the operation at the orthogonal basis function set generator 14 of FIG. 1.

Figure 3:
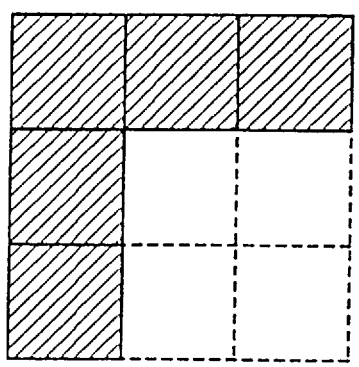
FIG. 3 shows an arbitrarily shaped segment (hatched portion) for discussing the operation of the arrangement of FIG. 1.

Merely for the convenience of description, it is assumed, as in the opening paragraphs of the instant disclosure, that an arbitrarily shaped segment (viz., reverse L-shaped block) of FIG. 3 has been applied to the generator 14 from the image segmentation circuit 10 of FIG. 1.

Figure 4:
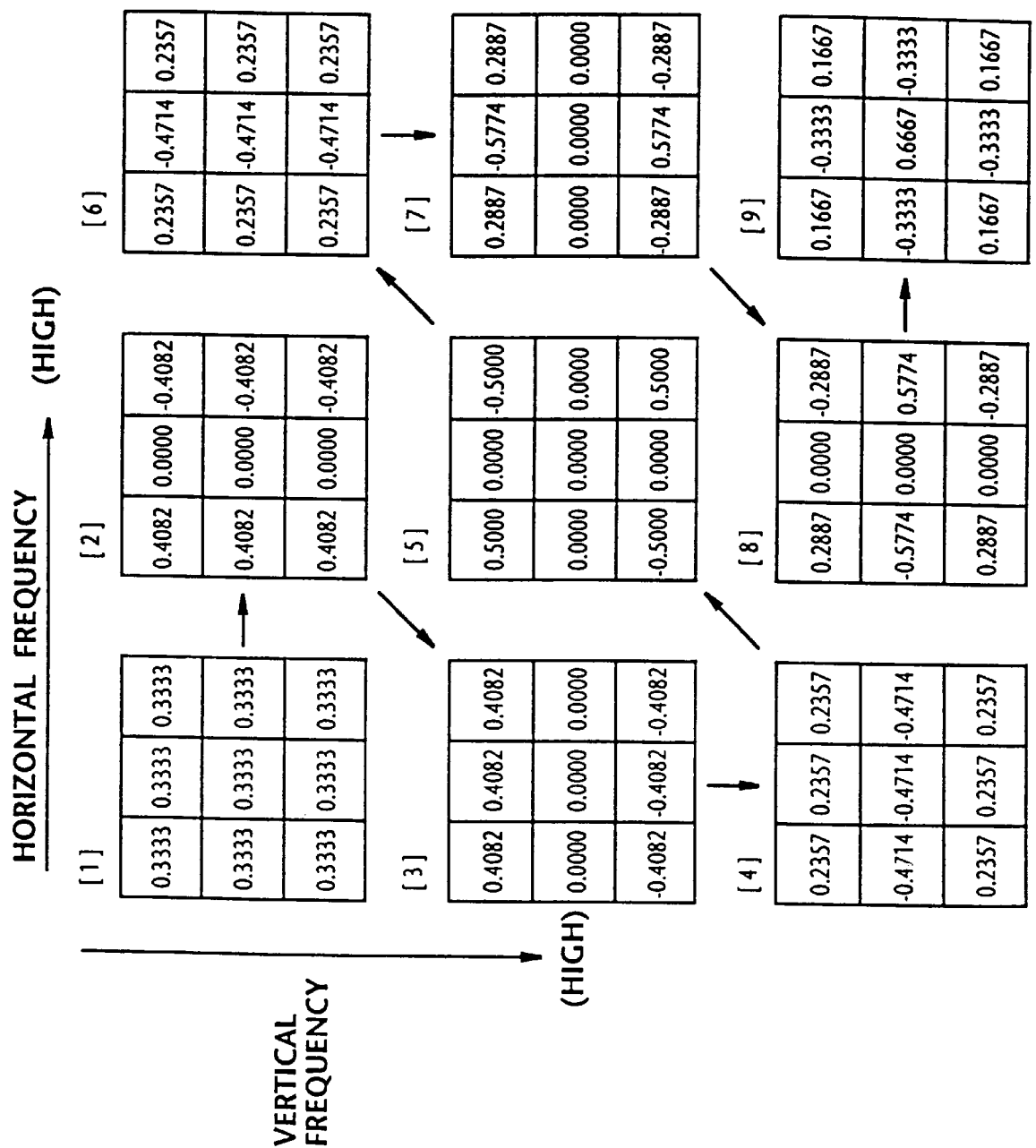
FIG. 4 is a table showing nine orthogonal basis functions with respect to a rectangle which includes the arbitrarily shaped segment of FIG. 3, having been referred to in the opening paragraphs of the instant disclosure.
Figure 5:
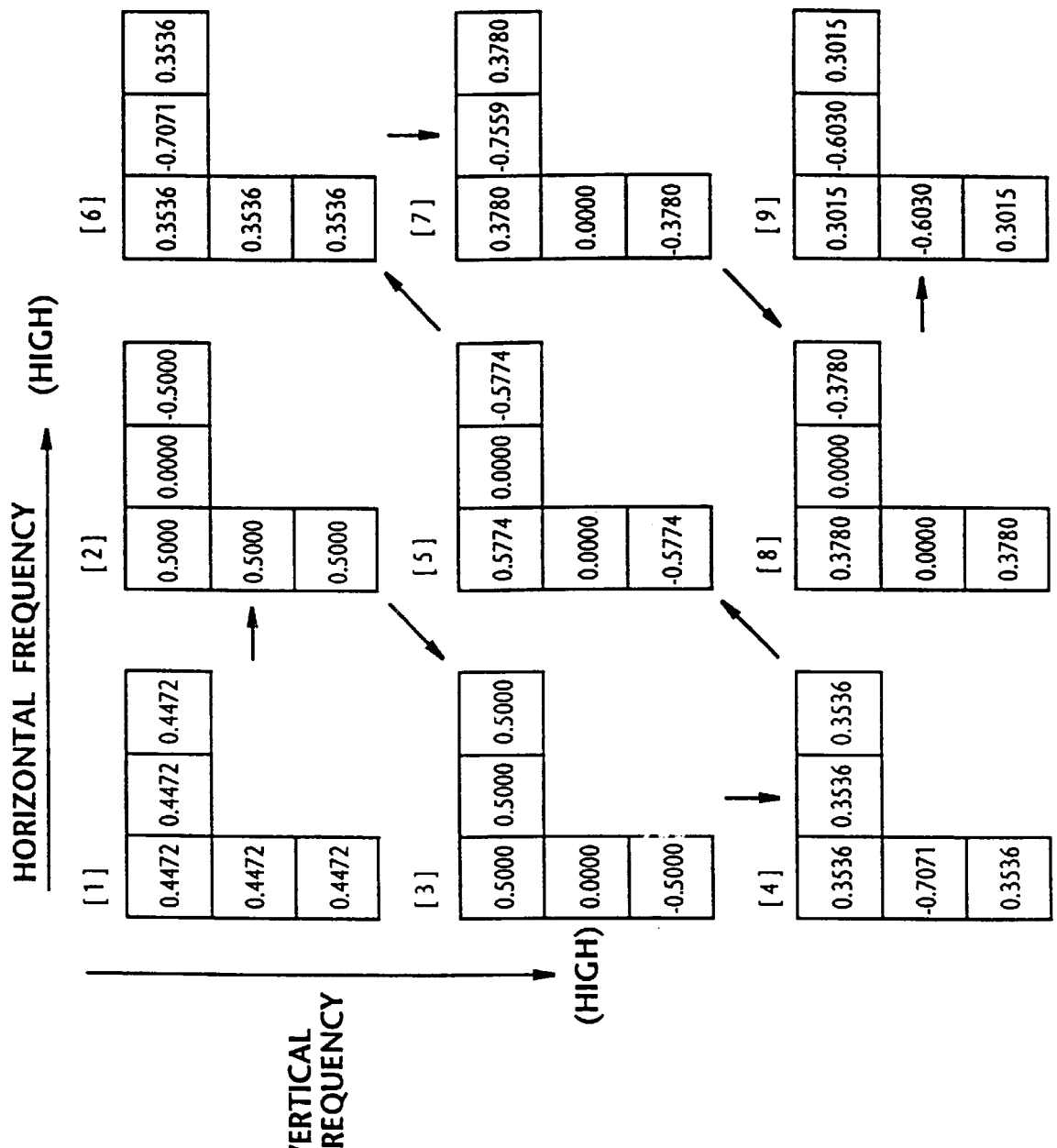
FIG. 5 is a table showing nine orthogonal basis function candidates with respect to the arbitrarily shaped segment of FIG. 3, having been referred to in the opening paragraphs of the instant disclosure.
Figure 8:
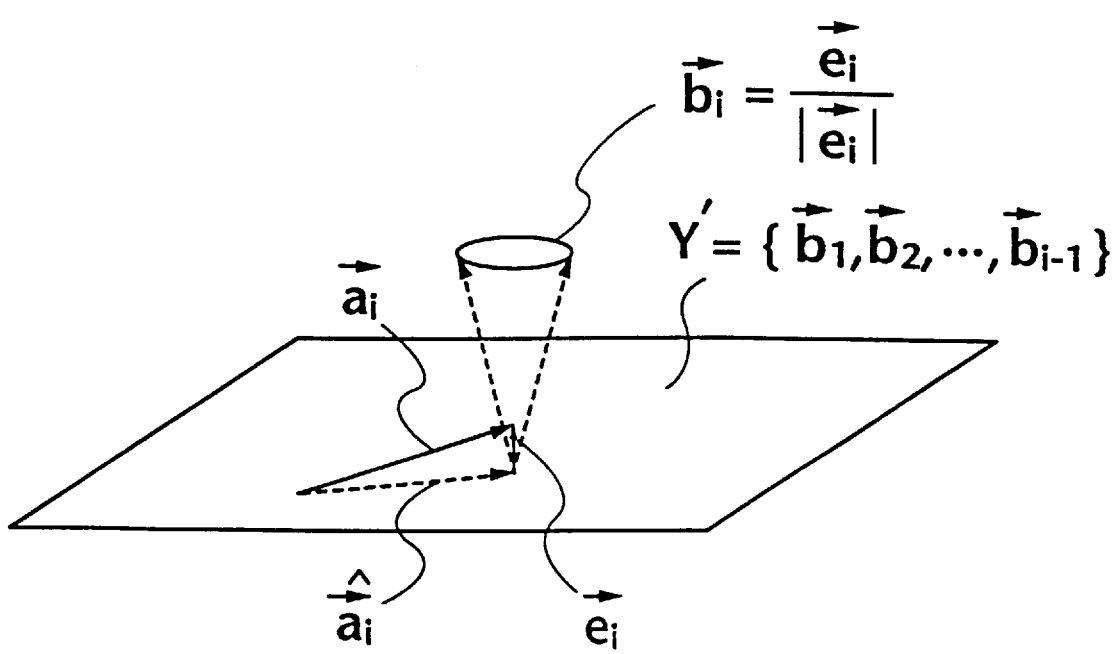
FIG. 8 is a sketch for describing the operation of one block of FIG. 1.

In FIG. 9, step 100 of the routine illustrated, comprises the operation wherein a set of the nine orthonormal basis functions shown in FIG. 4 is determined in connection with the rectangle which includes five pixels as shown in FIG. 3. Following this, at step 101 a set of the nine orthogonal basis function candidates is determined based on the orthonormal basis functions which are defined by the region of the reverse L-shaped block (FIG. 5). At step 102 the basis function candidates thus obtained are numbered along the zigzag-like scan as indicated by [1]–[9] in FIG. 5. At step 103, the first basis function candidate (depicted by [1] in FIG. 5) is extracted and defined as the first orthogonal basis function, and the routine flows to step 104 wherein the next basis function candidate (depicted by [2] at this time) is extracted.

At step 105, determined is an orthogonal component which is perpendicular to a hyperplane spanned by the basis function which has been determined. This operation is implemented using the known Gram-Schmidt orthogonalizing process. Subsequently, at step 106 it is determined if the absolute value of the orthogonal component obtained at step 105 exceeds a threshold value. At step 106, a basis function candidate, whose orthogonality is small (viz., the orthogonal component $e_i$ does not exceed the threshold value), can effectively be canceled. Further, a basis function candidate, which Is not linearly independent (viz., the orthogonal component is zero), can be omitted.

If the answer is not affirmative (viz., NO) at step 106, the routine goes back to step 104 wherein the next orthogonal basis function candidate [3] is extracted and the above mentioned operation is repeated. Contrarily, if the answer is affirmative at step 106, at step 107 the orthogonal component obtained at step 105 is adopted as the next orthogonal basis function at step 105 (if the routine goes to this step), Following this, it is determined if the number of the orthogonal basis functions obtained is equal to the number of the pixels in the arbitrarily shaped segment (viz., the reverse L-shaped block). In the event that the answer is affirmative at step 108, the program is terminated. Otherwise, the routine returns to step 104.

At step 106, if the i-th basis function candidate is depicted as $a_i$ and if the basis functions $b_k$ (k=1, 2, ... ,j (j<i)) have been determined, then the orthogonal component $e_i$ is given by $$e_i = a_i - \sum_{K=1}^{j} [(a_i \cdot b_k)/(b_k \cdot b_k)] \cdot b_k \qquad (9)$$

It the vector $e_i$ does not exceed the predetermine value, it is canceled at step 106 as mentioned above.

The threshold value used at step 106 is determined considering what value is appropriate in order to achieve effective reduction of calculation errors without adversely affecting the operation results.

FIG. 10 is a table showing five orthogonal basis functions obtained, using the first embodiment, with respect to the reverse L-shaped segment shown in FIG. 3. In FIG. 10, each of the numerals parenthesized (viz., [1]–[4] and [6]) at the top portions of the orthogonal basis functions, indicates the number when the zigzag-like scan is implemented as shown in FIGS. 4 and 5. It is understood that the fifth basis function candidate is not selected at step 106 in this case. Instead, the sixth basis function candidate is selected.

FIG. 11 shows an inner product matrix obtained from the orthogonal basis functions shown in FIG. 10. It is understood that the inner product matrix of FIG. 11 is a unit matrix.

Figure 12:
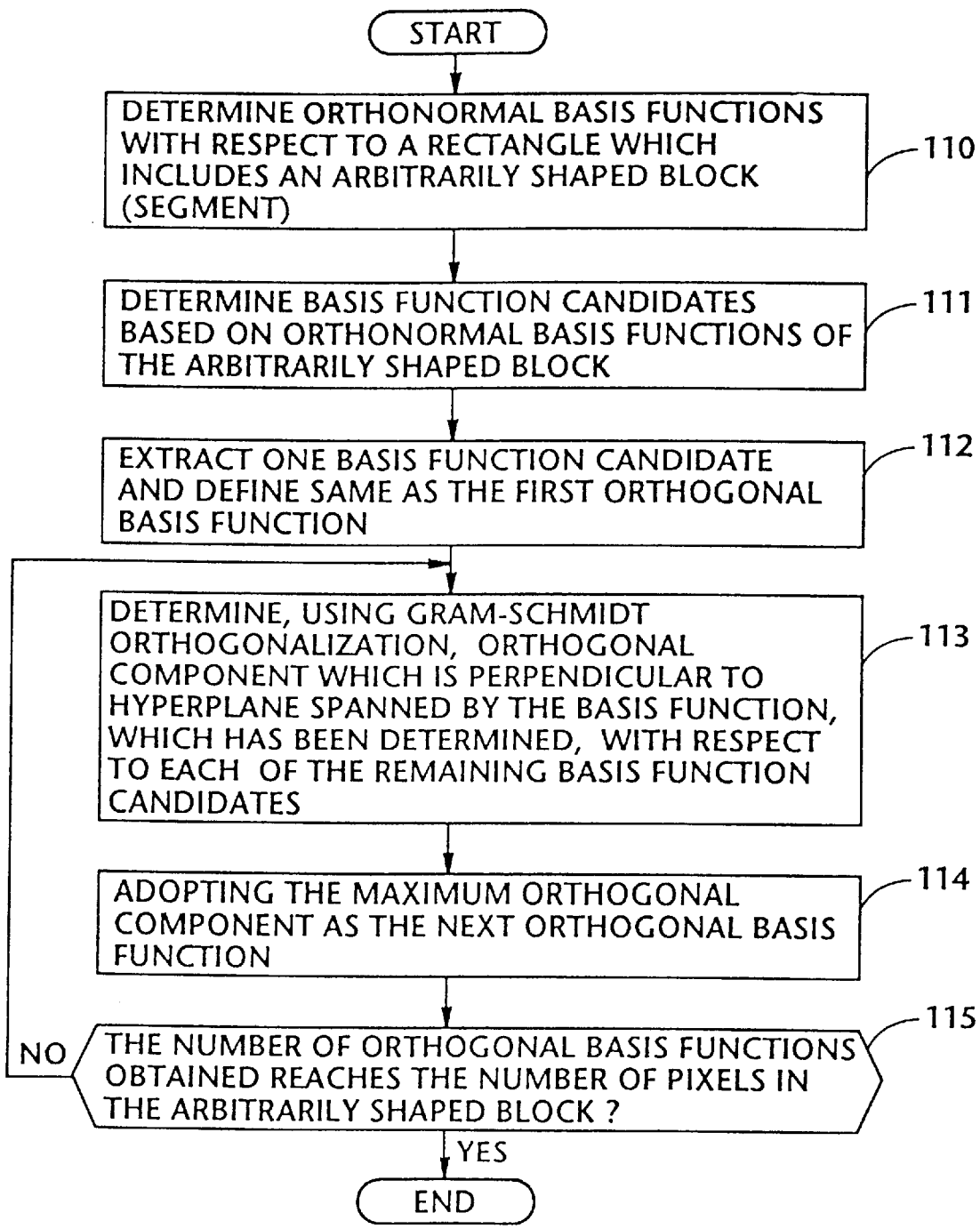
FIG. 12 is a flow chart which depicts steps which characterize a second embodiment of the present invention.

FIG. 12 is a flow chart which depicts the operation which characterizes the second embodiment of the present invention.

As in the first embodiment, an arbitrarily shaped segment (viz., reverse L-shaped block) of FIG. 3 has been applied to the generator 14 from the image segmentation circuit 10 of FIG. 1.

In FIG. 12, steps 110 and 111 are same as steps 100 and 101 of FIG. 9. That is to say, at step 110, a set of the nine orthonormal basis functions shown in FIG. 4 is determined in connection with the rectangle which includes five pixels shown in FIG. 3. Following this, at step 111, a set of the nine orthogonal basis function candidates is determined based on the orthonormal basis functions which are defined by the region of the reverse L-shaped block (FIG. 5).

At step 112, one of the basis function candidates is extracted and will be used as the first orthogonal basis function at step 113. At step 113, an orthogonal component is determined which is perpendicular to a hyperplane spanned by the basis function, which has been determined, with respect to each of the remaining basis function candidates. The operation at step 113 is implemented using the known Gram-Schmidt orthogonalizing process.

At step 114, the maximum orthogonal component among those obtained at step 113 is selected and also used as the next orthogonal basis function at step 113 (if the routine goes back to step 113).

At step 115 it is determined if the number of the orthogonal basis functions obtained is equal to the number of the pixels in the arbitrarily shaped segment (viz., the reverse L-shaped block). If the answer is affirmative at step 115, the program is terminated. Otherwise (viz., the answer is NO), the routine returns to step 113 wherein the orthogonal component of each of all the remaining basis function candidates is determined. That is, the number of the basis function candidates is reduced by one every time the one looped operations at steps 113–115 is completed.

FIG. 13 is a table showing five orthogonal basis functions obtained with respect to the reverse L-shaped segment shown in FIG. 3, using the second embodiment. As shown in FIG. 13, the orthogonal basis function candidates [1], [9], [5], [2], and [8] are extracted in this order and then utilized to obtain the five orthogonal basis functions.

FIG. 14 shows an inner product matrix obtained from the orthogonal basis functions shown in FIG. 13. It is understood that the inner product matrix of FIG. 11 is a unit matrix.

Finally, the third embodiment of the present invention will be discussed with reference to a flow chart shown in FIG. 15.

Figure 15:
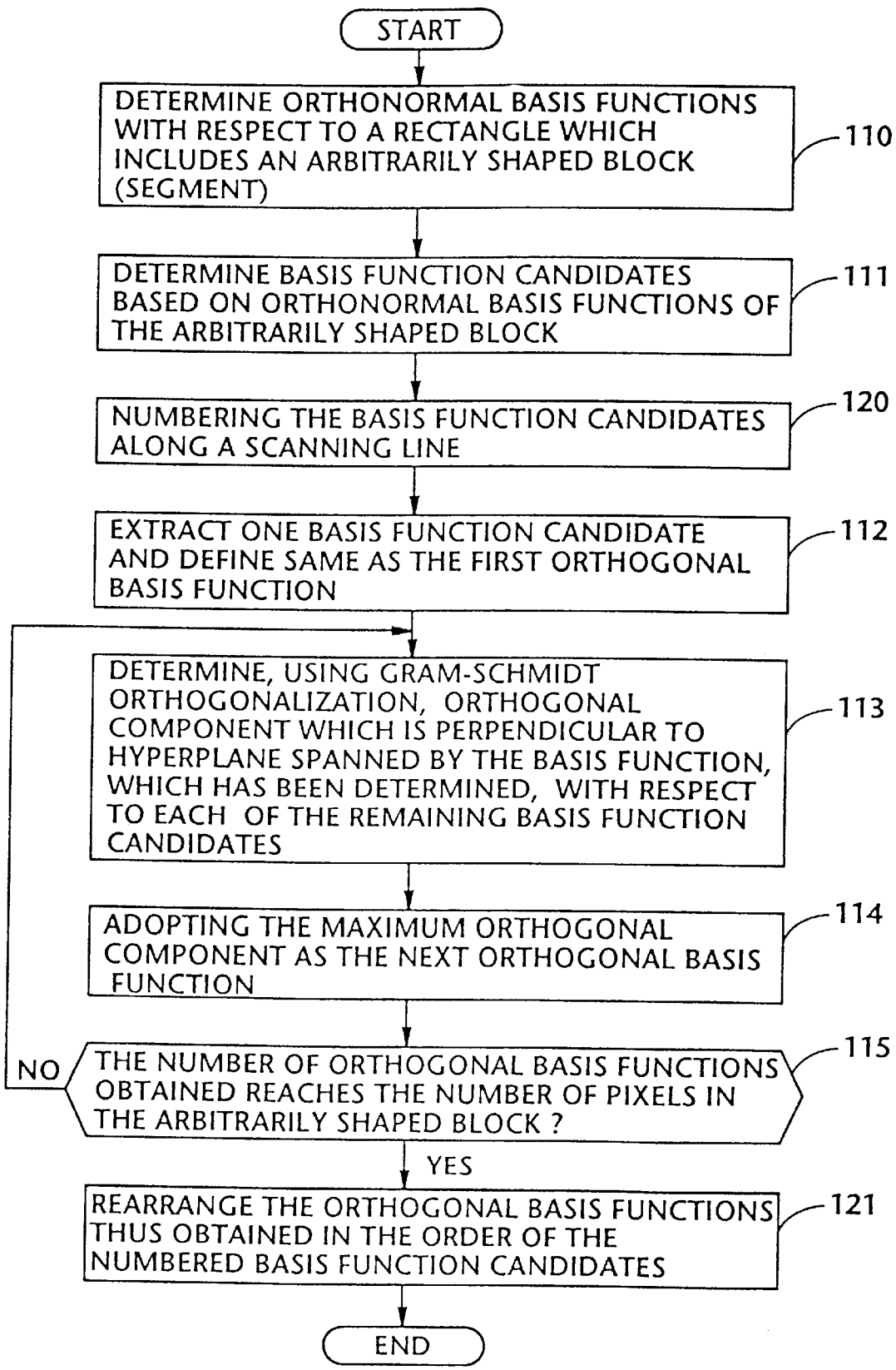
FIG. 15 is a flow chart which depicts steps which characterize a third embodiment of the present invention.

The flow chart of FIG. 15 includes steps 120 and 121 in addition to steps 110–115 of FIG. 12. Thus, steps 110–115 will not be described for the sake of simplifying the disclosure. Step 120 corresponds to step 102 of FIG. 9 (first embodiment). That is, at step 120 the basis function candidates obtained at step 111 are numbered along the zigzag-like scan as indicated by [1]–[9] in FIG. 5. Further, at step 121, the orthogonal basis functions are rearranged in the order of the numbered basis function candidates.

FIG. 16 is a table showing five orthogonal basis functions obtained with respect to the reverse L-shaped segment, using the third embodiment. The orthogonal basis function candidates correspond to those shown in FIG. 13 but arranged in the order of [1], [2], [5], [8], and [9].

FIG. 17 shows an inner product matrix obtained from the orthogonal basis functions shown in FIG. 16. It is understood that the inner product matrix of FIG. 11 is a unit matrix.

It will be understood that the above disclosure is representative of three possible embodiments of the present invention and that the concept on which the invention is based is not specifically limited thereto.

What is claimed is:

1. A method of generating a set of orthogonal basis functions in an image processing system, comprising the steps of:

(a) generating a contour signal of an arbitrarily shaped image segment;

(b) receiving said contour signal and determining a set of orthonormal basis functions with respect to a rectangular region of n pixels long by m pixels wide which includes said arbitrarily shaped image segment, at least one of n and m being an integer greater than one;

(c) determining a set of orthogonal basis function candidates using a set of said orthonormal basis functions;

(d) numbering said orthogonal basis function candidates along a zigzag scan so as to obtain a numbered order of pixels within said rectangular region;

(e) extracting a first orthogonal basis function candidate from the set of said orthogonal basis function candidates numbered at step (d) and defining said first orthogonal basis function candidate as a first orthogonal basis function;

(f) extracting a next orthogonal basis function candidate in the numbered order;

(g) determining an orthogonal component with respect to the next orthogonal basis function candidate, the orthogonal component being perpendicular to a hyperplane spanned by the orthogonal basis function;

(h) checking to see if an absolute value of said orthogonal component obtained at step (g) exceeds a threshold;

(i) returning to step (f) if said absolute value is equal to or less than said threshold;

(j) selecting said orthogonal component obtained at step (g) as a next orthogonal basis function if said absolute value exceeds said threshold; and (k) returning to step (f) if the number of the orthogonal basis functions thus far obtained does not reach a number of pixels in said arbitrarily shaped image segment, and terminating generation of additional orthogonal basis functions if the number of orthogonal basis functions thus far obtained reaches the number of pixels.

2. A method of generating a set of orthogonal basis functions in an image processing system, comprising the steps of:

(a) generating a contour signal of an arbitrarily shaped image segment;

(b) receiving said contour signal and determining a set of orthonormal basis functions with respect to a rectangular region of n pixels long by m pixels wide which includes said arbitrarily shaped image segment, at least one of n and m being an integer greater than one;

(c) determining a set of orthogonal basis function candidates using a set of said orthonormal basis functions;

(d) extracting an orthogonal basis function candidate from the set of said orthogonal basis function candidates and defining said orthogonal basis function candidate as a first orthogonal basis function;

(e) determining an orthogonal component with respect to each of remaining orthogonal basis function candidates, each orthogonal component being perpendicular to a hyper plane spanned by the orthogonal basis function;

(f) selecting a maximum orthogonal component from the orthogonal components obtained in step (e) and adopting said maximum orthogonal component as a next orthogonal basis function; and (g) returning to step (e) if a number of the orthogonal basis functions thus far obtained does not reach a number of pixels in said arbitrarily shaped image segment, and terminating generation of additional orthogonal basis functions if the number of orthogonal basis functions thus far obtained reaches the number of the pixels.

3. A method of generating a set of orthogonal basis functions in an image processing system, comprising the steps of:

(a) generating a contour signal of an arbitrarily shaped image segment;

(b) receiving said contour signal and determining a set of orthonormal basis functions with respect to a rectangular region of n pixels long by m pixels wide which includes said arbitrarily shaped image segment, at least one of n and m being an integer greater than one;

(c) determining a set of orthogonal basis function candidates using a set of said orthonormal basis functions;

(d) numbering said orthogonal basis function candidates along a zigzag scan so as to obtain a numbered order of pixels within said rectangular region;

(e) extracting an orthogonal basis function candidate from the set of said orthogonal basis function candidates and defining said orthogonal basis function candidate as a first orthogonal basis function;

(f) determining an orthogonal component with respect to each of remaining orthogonal basis function candidates, each orthogonal component being perpendicular to a hyper plane spanned by the orthogonal basis function;

(g) selecting a maximum orthogonal component from the orthogonal components obtained in step (f) and adopting said maximum orthogonal component as a next orthogonal basis function; and (h) returning to step (f) if a number of the orthogonal basis functions thus far obtained does not reach a number of pixels in said arbitrarily shaped image segment, and rearranging the orthogonal basis functions thus far obtained and subsequently terminating generation of additional orthogonal basis functions if the number of the orthogonal basis functions thus far obtained reaches the number of the pixels.

4. A method of generating a set of orthogonal basis functions as recited in claim 1, wherein the arbitrarily shaped image segment occupies p pixels of the rectangular region, p being an integer equal to or less than n multiplied by m.

* * * * *